No. 707,533. Patented Aug. 26, 1902.
T. ALBEE.
CHECK HOOK KEEPER.
(Application filed Apr. 1, 1902.)

(No Model.)

Witnesses
Thomas Albee, Inventor.
by
Attorneys

UNITED STATES PATENT OFFICE.

THOMAS ALBEE, OF HALLSTEAD, PENNSYLVANIA.

CHECK-HOOK KEEPER.

SPECIFICATION forming part of Letters Patent No. 707,533, dated August 26, 1902.

Application filed April 1, 1902. Serial No. 100,978. (No model.)

*To all whom it may concern:*

Be it known that I, THOMAS ALBEE, a citizen of the United States, residing at Hallstead, in the county of Susquehanna and State of Pennsylvania, have invented a new and useful Check-Hook Attachment, of which the following is a specification.

This invention relates to attachments to checkrein-hooks of harness for the purpose of preventing the checkrein from becoming accidentally detached; and the invention consists in certain novel features of construction whereby the device may be readily attached to any checkrein-hook, all as hereinafter shown and described, and specified in the claim.

Figure 1:
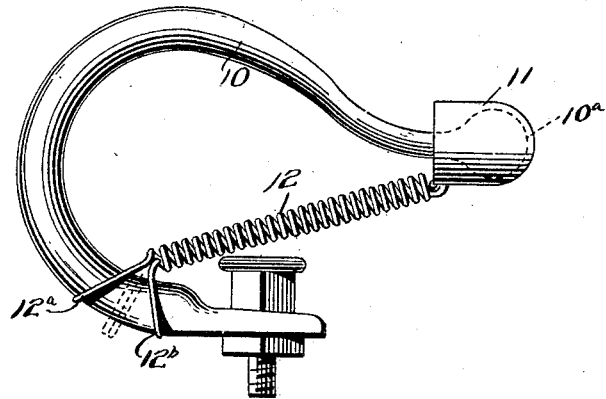
Figure 2:
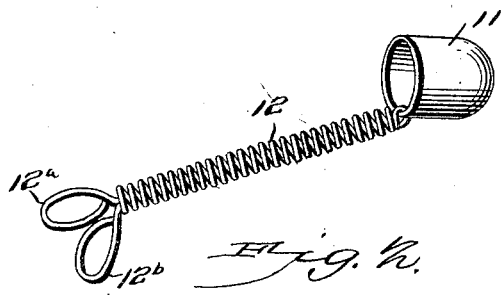

In the drawings illustrative of the invention, Figure 1 is a side view of a checkrein-hook with one of the improved devices attached thereto. Fig. 2 is a perspective view of the attachment disengaged from the hook.

The device may be attached to any form of checkrein-hook, and such a hook is represented at 10.

The improved attachment consists of a cap or thimble 11, adapted to engage the free end $10^a$ of the checkrein-hook 10 and having one end of a spring 12 connected thereto, as shown. The end of the spring is formed with two coupled loops or rings $12^a$ $12^b$, which are adapted to encircle the shank of the hook 10, as shown in Fig. 1.

The loops $12^a$ $12^b$ are formed and connected so as to be normally held with their outer ends yieldably distended, so that when in position upon the hook 10 they exert their force in opposite directions and cramp the spring in position upon the hook and retain it wherever it may be set. By this simple means the spring may be adjusted along the shank of the hook and will remain in any desired position and be immovable by any strains exerted upon it longitudinally of the spring.

If it is desired to remove the spring from the hook, it can be done by pressing the distended loops $12^a$ $12^b$ together, as indicated by dotted lines in Fig. 2, when they may be readily slipped along the hook and the device removed. The loops will not move along the hook, however, unless they are so closed, and as this closure would not occur during the operation of the holder or by any pressure exerted upon them by the checkrein or any other part of the harness the holder will remain intact until released manually, as above noted. This makes a very simple, cheap, and effective device and efficiently performs the service for which it is intended and retains the checkrein safely within the hook and prevents its accidental displacement.

Any form of spring or springs of any suitable material may be employed, and the proportions may be varied and minor modifications introduced without departing from the spirit or scope of the invention.

What I claim is—

As a new article of manufacture, a checkrein-hook attachment consisting of a spring having a cap at one end adapted to engage the free end of the checkrein-hook and with two normally distended loops upon the other end adapted to engage the shank of the hook and exert a gripping force thereon, substantially as described.

In testimony that I claim the foregoing as my own I have hereto affixed my signature in the presence of two witnesses.

THOMAS ALBEE.

Witnesses:
S. B. CHASE,
H. J. CARVER.